Dec. 31, 1968  R. BALDUR  3,418,865

MULTIPLE DRIVE FOR LARGE GEARS

Filed June 19, 1967

INVENTOR.
ROMAN BALDUR

BY

Patent Agent 3,418,865
MULTIPLE DRIVE FOR LARGE GEARS
Roman Baldur, Baie d'Urfe, Quebec, Canada, assignor to Dominion Engineering Works, Limited, Lachine, Quebec, Canada, a corporation of Canada
Filed June 19, 1967, Ser. No. 647,062
5 Claims. (Cl. 74—410)

ABSTRACT OF THE DISCLOSURE

In driving a single large gear wheel with two or more synchronous motors, the problem of "motoring" due to cyclic variations in the gearing transmission is avoided by mechanically interconnecting the stators of the synchronous motors in counterbalanced torque equalizing relationship to maintain both motors in a substantially equally loaded state at all times.

---

This invention is directed to a method for providing a multiple drive for large gears, and to apparatus for carrying out that method.

In the operation of heavy machinery such as large grinding mills where it is not economic to drive the machine by a single synchronous motor owing to the limitations of gear sizes, it is the practice to employ a plurality of two or more synchronous electric motors driving a common gear wheel connected to the machine. Substantial advantages are to be obtained by the use of mutiple synchronous motors, but a serious problem arises in maintaining both motors in a continuously balanced condition. Owing to normal manufacturing tolerances the geometry of the gear surfaces of the common gear wheel of the transmission cannot be maintained exactly constant, which in operation produces cyclically occurring irregularities. This has the effect of instantaneously changing the loading of the respective motor having its pinion in contact with an irregularity. Owing to the characteristic behaviour of parallel connected synchronous motors the unbalancing of load conditions sometimes causes undesirable electrical surges. For these reasons the use of multiple synchronous motors has not been practicable and a more expensive arrangement has been necessary.

The present invention provides a method of operating a pair of synchronous electric motors in load balanced relation by mechanically connecting the stators of the two motors in torque opposing relation so as to equalize local load variations between the two machines, and to ensure stable motoring operation. When the torque on one of the pinions is slightly altered, the interconnection between the stators causes them to rotate. This changes the electric load due to the inherent properties of synchronous motors, and a new relative position of the two stators is obtained which ensures equal power output from each.

While the following disclosure particularly describes an arrangement of a large gear wheel driven by a pair of like motors, it will be understood that a greater number of motors may be similarly employed, while maintaining a balanced load sharing condition.

The present invention thus provides in a twin drive transmission having a large gear wheel driven by a plurality of driving pinion wheels positioned in space arrangement about the periphery of the gear wheel, each pinion wheel being connected with the rotary output portion of a synchronous electric motor, the improvement comprising torque balance means moveably connected with the stationary portion of at least one of the motors to provide a resilient opposing torque thereto, to permit limited deflection of the stationary motor portion in a torque loading and unloading mode, relative to the respective pinion wheel in response to local variations in loading of the pinion wheel, whereby the electrical load on each motor is substantially equalized in response to the pinion wheel load variation.

Certain embodiments of the present invention are described by way of example, reference being had to the accompanying drawings wherein FIGURE 1 is a diagrammatic side view of one embodiment of the arrangement;

Figure 1:
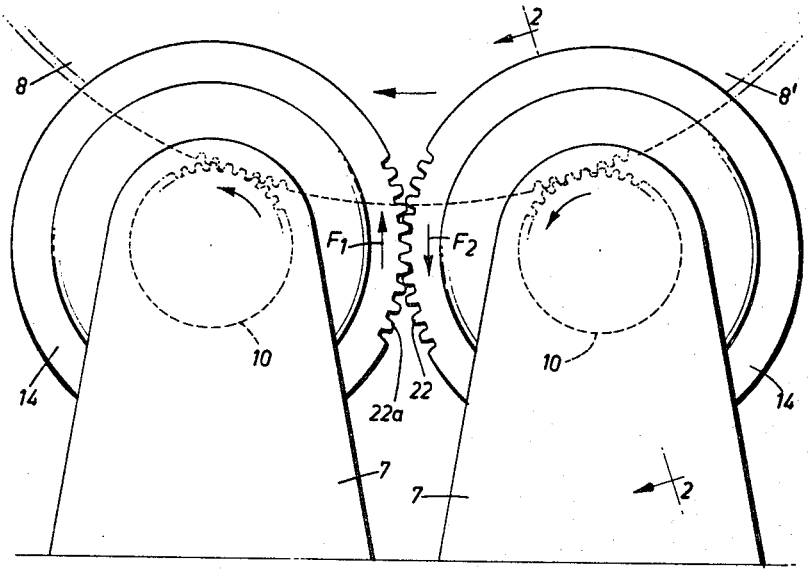
Figure 2:
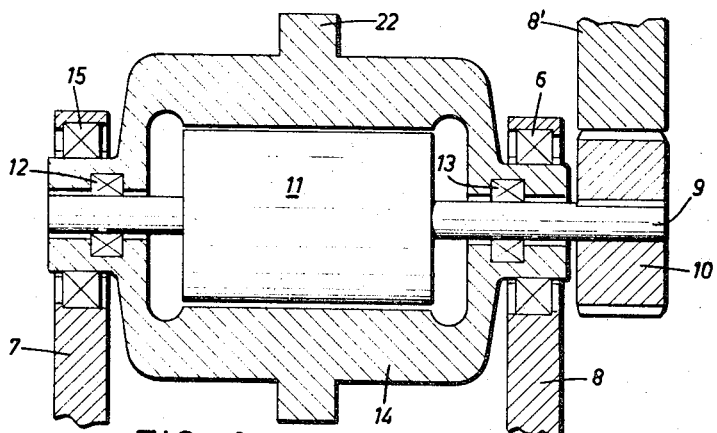
FIGURE 2 is a sectional view taken on the line 2—2 of FIGURE 1.

Referring to FIGURES 1 and 2 a large diameter gear wheel 8 or driving connection to a load such as a grinding mill (not shown) is mounted in meshing engagement with a pair of similar driving pinions 10. Each pinion 10 is mounted on the output shaft 9 of the respective synchronous motor. Each synchronous motor comprises a stator 14 rotatably mounted on support pedestals 7, 8 by means of bearings 6, 15. The rotor 11 is rotatably supported within the stator 14 by means of shaft bearings 12, 13.

The respective motors have teeth segments 22, 22a in meshing engagement.

Referring to the rotational arrows of FIGURE 1 it will be seen that anti-clockwise rotation of the pinion wheels 10 produce clockwise rotation of the gear wheel 8. The torque reaction forces of the respective stators produce oppositely acting reactive forces $F_1$ and $F_2$ in the respective other stator. Thus in the case of the right hand motor of FIGURE 1, the clockwise torque acting on the stator 14 thereof produces a stabilizing reactive forces $F_1$ acting on the stator of the left hand motor, as illustrated, to counter the stator torque of the left hand motor.

In operation, owing to the unavoidable occurrence of variations in geometry of the teeth of the gear wheel 8 one or more irregularities pass cyclically, contacting first the right hand motor and then the left hand motor. When the right hand motor contacts an irregularity the torque exerted by the motor instantaneously changes, tending to cause the right hand stator 14 to rotate. This changes the stabilizing reaction forces $F_1$ and $F_2$ so that new relative angular positions are taken by the two stators and equilibrium is again obtained. Within the limits of the inertial lag of the system the loads remain substantially equalized.

In addition to providing substantially instantaneous load balancing, it will also be seen that the present invention provides continuous load balancing to offset changes produced in the system by such things as foundation settlement, bearing wear etc.

Figures 3, 4:
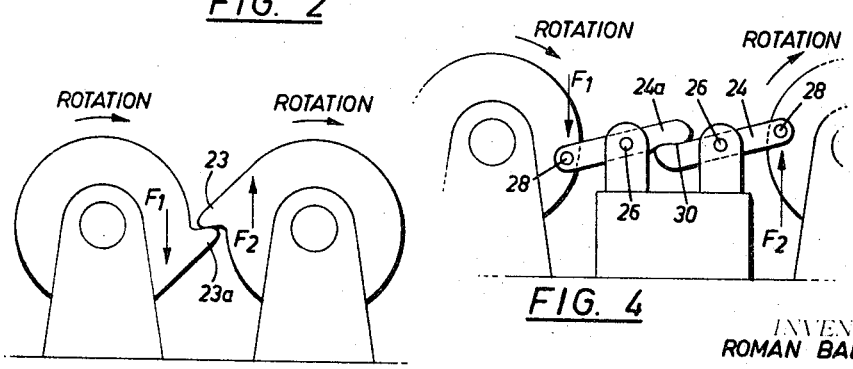
FIGURE 3 is a schematic side view of an alternative stator connecting arrangement.
FIGURE 4 is a schematic side view of a further stator connecting arrangement.

Referring to the embodiments illustrated in FIGURE 3, in place of a plurality of interacting teeth 22, 22a a single set of meshing lobes 23, 23a is employed.

The embodiment of FIGURE 4 is adapted for use with a drive system in which the stators of the driving motors are further displaced one from the other relative to their size. Thus in this arrangement torque links 24, 24a pivotally mounted at 26 on supporting posts are pivotally pinned at 28 to the respective stators to provide continuous balance of stator reaction forces.

In considering the function of the system it will be seen that certain benefits of the arrangement may be obtained by providing one of a pair of synchronous motors with a resiliently loaded stator so as to minimize the variation in the load condition of the motor.

It will be understood that in a system employing motors of uneven torque, the moment arms of the respective stators may be correspondingly compensated to permit stable operation of the system in the manner described.

What I claim as new and desire to secure by Letters Patent of the United States is:

1. In a multiple drive transmission having a large gear wheel driven by a plurality of driving pinion wheels positioned in spaced arrangement about the periphery of the gear wheel, each pinion wheel being connected with the rotary output portion of a synchronous electric motor, the improvement comprising torque balance means moveably connected with the stationary portion of at least one said motor to provide a resilient opposing torque thereto to permit limited rotation of said stationary motor portion in a torque loading and unloading mode, relative to the respective said pinion wheel in response to local variations in loading of the pinion wheel, whereby the electrical load on said motor is substantially unchanged in response to said pinion wheel load variation.

2. The transmission as claimed in claim 1 having two said motors adjacent one another, said torque balance means connecting the respective said stationary portion of said motors in torque opposing relation when operating in a common driving direction, whereby movement of one said stationary portion in reactive response to a local variation in torque loading thereof produces opposite movement of the other said stationary portion, to provide a corresponding variation in torque loading of the other said motor and the associated pinion wheel.

3. The transmission as claimed in claim 2 wherein said torque balance means connecting said stators comprises a plurality of tooth means extending from said stators in mutual meshing arrangement, said stators being supported in bearings for rotative movement about the respective motor access.

4. The transmission as claimed in claim 2 wherein said torque balance means comprise a lobe member extending outwardly from each said stator in mutual facing contact one with the other to provide a balance of reactive forces.

5. The transmission as claimed in claim 2 wherein said torque balance means comprises pivotal levers extending from the respective stators and connecting in torque balancing relation.

References Cited

UNITED STATES PATENTS

| | | | |
|---|---|---|---|
| 2,911,845 | 11/1959 | North | 74—410 |
| 3,036,475 | 5/1962 | Haupt | 74—410 |
| 3,316,772 | 5/1967 | Jones | 74—41ʳ |

DONLEY J. STOCKING, *Primary Examiner.*

LEONARD H. GERIN, *Assistant Examiner.*